March 31, 1942. C. E. MEYERHOEFER 2,277,869
DEFROSTING ATTACHMENT
Filed July 26, 1939
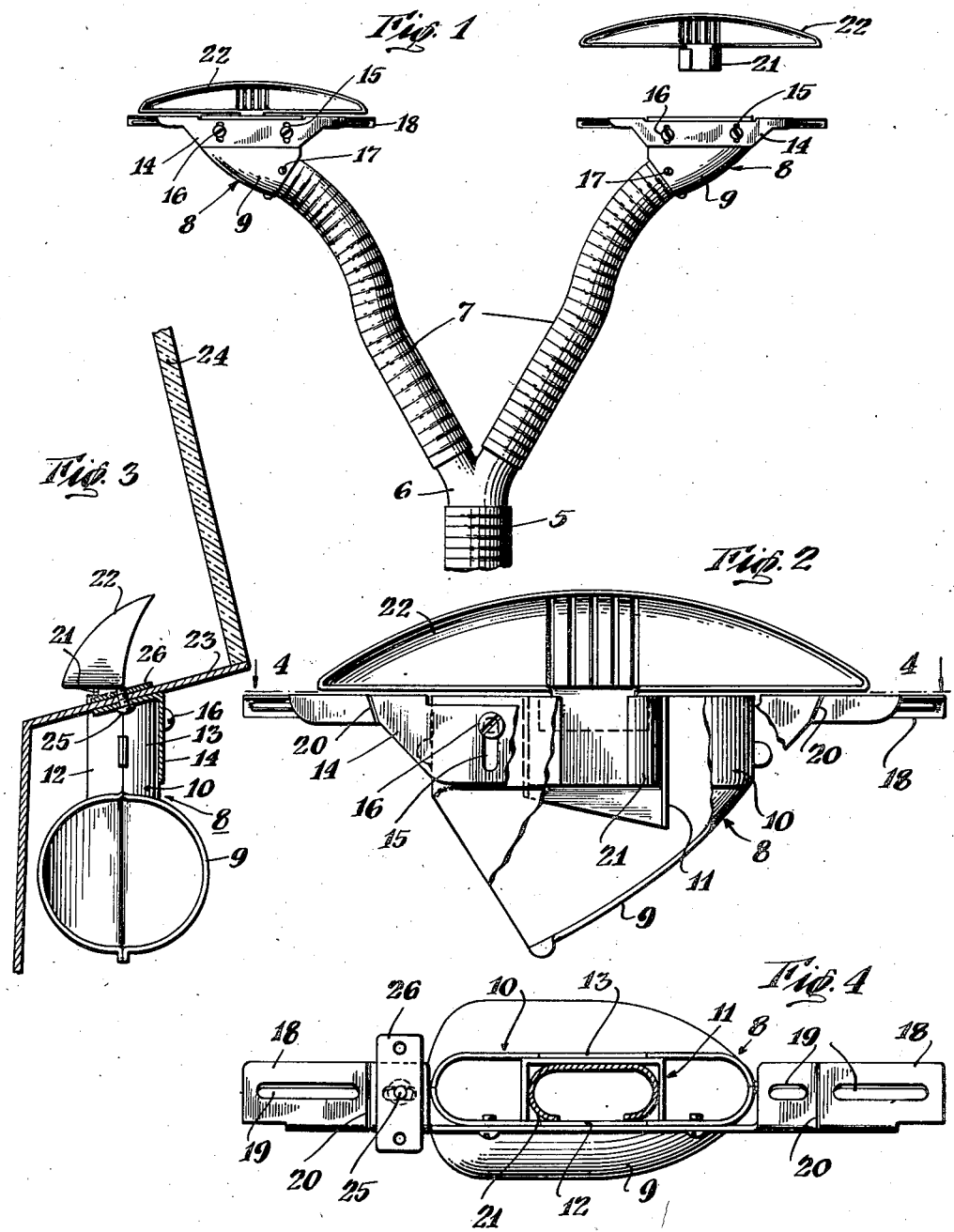
INVENTOR
Carl E. Meyerhoefer
BY
Duell, Kane and Smoot
ATTORNEYS Patented Mar. 31, 1942

2,277,869

UNITED STATES PATENT OFFICE 2,277,869

DEFROSTING ATTACHMENT

Carl E. Meyerhoefer, Brooklyn, N. Y., assignor to E. A. Laboratories, Inc., Brooklyn, N. Y., a corporation of New York Application July 26, 1939, Serial No. 286,497

1 Claim. (Cl. 20—40.5)

This invention relates to an attachment and particularly, a structurally and functionally improved attachment to be employed for defrosting purposes.

It is the object of the invention to furnish a unit of this character which may be employed in numerous different associations but which is primarily intended for use in connection with a motor vehicle and for the purpose of conducting warmed air from the heater of the vehicle to a point adjacent the windshield of the same. Consequently, sleet, ice, snow and moisture deposits are prevented from building up on the windshield and the driver will have proper visibility.

It is the object of the invention to furnish an attachment of this nature which will be extremely compact and, when mounted in applied position, will be inconspicuous aside from the fact that it will in no wise interfere with the conventional mechanism associated with the vehicle.

A further object of the invention is that of providing a defrosting attachment which will embody a construction such that it may readily be adapted by even an unskilled person to various makes of motor cars and heaters.

An additional object is that of furnishing an attachment which will embody relatively few parts, each individually simple and rugged in construction, such parts operating over long periods of time with freedom from all mechanical difficulties.

With these and other objects in mind, reference is had to the attached sheet of drawings wherein there is illustrated one practical embodiment of the invention and in which:

Fig. 1 is a front elevation of the attachment with one of the deflectors attached;

Fig. 2 is a front elevation of a unit forming a part of such attachment and with certain parts broken away to disclose underlying constructions;

Fig. 3 is a sectional side view taken through the windshield and dash, showing an attachment in mounted position; and Fig. 4 is a sectional plan view taken along the line 4—4 and in the direction of the arrows, as indicated in Fig. 2.

Referring primarily to Fig. 1, the numeral 5 indicates a flexible hose or conduit which may be attached to the outlet of a heater (not shown). The method of coupling and mounting these parts is well known to those skilled in the art and is commonly employed for the purpose of conducting warmed air to a point adjacent the windshield of the motor vehicle or otherwise within the body of the latter.

Attached to hose 5 is a fitting 6 which is preferably Y-shaped, and extending from this fitting are a pair of further tubes 7. The fitting may be secured to one of the walls of the vehicle body in any desired manner and so arranged that the tubes 7 may extend in contact with or adjacent this wall and underneath the dash of the vehicle.

Secured to the outer ends of tubes 7 are nozzle elements 8 which may be formed of sheet metal. As illustrated, these elements may include a lower circular portion 9 which merges into an upper oblong portion 10. The latter is divided into compartments by employing, for example, a U-shaped channel member 11, the arms of which extend transversely of portion 10. Preferably, within the space defined by the arms of the channel member 11, element 10 is formed with removable portions 12 and 13, provided by forming score lines in the walls of the element 10. It is thus obvious that these portions may readily be broken down by means of an ordinary pair of pliers by a relatively unskilled operator.

The ends of tubes 7 are fitted within the circular portions 9 and may be secured in such position by, for example, screws 17. Each of the nozzle elements 8 may be mounted by means of brackets. These brackets conveniently include a central body portion 14, formed with transversely extending slots 15 through which screws 16 may project to secure the body in any desired position with respect to the nozzles 8.

The brackets are also preferably formed of sheet metal which at points beyond the body portion 14 are extended in the form of arms 18, the surface of which is inclined to the axis of the nozzle. These arms are formed with pairs of slots 19 and between these slots a line of scoring 20 may be furnished so that the outer portion of the arms may readily be broken off by a pair of pliers, or otherwise.

A deflector is associated with each of the brackets. This deflector may include a tubular portion 21, which is longitudinally slitted and is of a size such that it may be introduced into the nozzles 8 and more especially, the oblong portion 10 of the same at a point between the arms of member 11. Incident to this slitting or in any other desired manner, the tubular portion 21 embodies resiliency such that it will expand within the nozzle and thus be maintained against displacement.

The tubular portion is continued in the form of an oblong plate 22 which inclines outwardly and is preferably curved, both transversely and longitudinally.

Accordingly, it follows, as shown in Fig. 3, that the dash 23, which is usually formed with an opening at the time of manufacture of the vehicle, may have applied to its under-face the bracket. The deflector, together with the portions of the nozzle adjacent the top edge of the same, will be disposed above the dash and the deflector will serve to divert warmed air towards the windshield 24. Obviously, by employing bolts or other fastening elements 25, bridging strips 26 may be secured in clamping relationship with respect to the bracket and dash to maintain the former firmly applied to the latter. As illustrated, these strips may simply include small oblong portions of metal formed with openings which conveniently receive the screws or other fastening elements 25.

With the parts assembled and mounted as described, it will be apparent that a stream of warm air may be directed against the inner face of the windshield. Also, it is apparent that an operator will have no difficulty in assembling the apparatus or mounting the same in the desired positions; it being of course understood that more than two nozzles could be provided or, conversely, a single nozzle might be employed. In the latter case, such single nozzle should be mounted either adjacent the center of the windshield or else somewhat in front of the driver of the vehicle. In such an installation, a single tube 7 might conveniently be directly coupled to the heater which supplies the warmed air.

The attachment is susceptible of application to virtually any type of vehicle, in that one or both of the end portions of arms 18 may readily be removed, should it be found that they interfere with the mounting of the device. Likewise, incident to the slots 15, the mounting bracket may be adjusted with reference to the nozzle so as to allow for automobile dash portions of various thicknesses. Additionally, where desired, one or both of portions 12 and 13 may be removed to allow for the proper assembly of the parts and where such assembly would otherwise be interfered with incident to the construction incorporated in the vehicle to which attachment is being applied.

From the foregoing it will be understood that among others the several objects of the invention, as specifically aforenoted, are achieved. Obviously, numerous changes in construction and rearrangements of the parts might be resorted to without departing from the spirit of the invention, as defined by the claim.

I claim:

A defrosting attachment including, a deflector to be applied to the upper-face of a dash and in line with an opening through the latter, a nozzle element to be disposed below said dash and also substantially in line with the opening therethrough, a bracket secured to said nozzle element and to be applied to the under-face of said dash for mounting the latter, a tubular extension forming a part of said deflector and adapted to project into said nozzle element, said extension in cross-section being materially smaller than said nozzle and the length of said deflector being at least equal to the length of said nozzle adjacent its discharge end and partition members mounted by said nozzle at points short of the ends of the latter and defining a space just adequate to receive said extension and whereby to maintain said deflector in position.

CARL E. MEYERHOEFER.